United States Patent [19]

Cuvelier

[11] Patent Number: 5,982,278
[45] Date of Patent: Nov. 9, 1999

[54] ROAD MONITORING DEVICE

[76] Inventor: Michel Cuvelier, 20 Eracle Street, Liege B4000, Belgium

[21] Appl. No.: 09/072,623

[22] Filed: May 5, 1998

Related U.S. Application Data

[63] Continuation of application No. PCT/BE96/00116, Nov. 4, 1996.

[30] Foreign Application Priority Data

Nov. 6, 1995 [BE] Belgium .................................. 9500904
Aug. 26, 1996 [BE] Belgium .................................. 9600718

[51] Int. Cl.$^6$ ...................................................... B60Q 1/00
[52] U.S. Cl. .......................... 340/436; 340/439; 340/580; 340/583; 340/905
[58] Field of Search ..................................... 340/436, 437, 340/439, 988, 435, 903, 580, 583, 600, 905; 180/168, 167, 169; 364/424.02, 424.01, 461; 250/338.1

[56] References Cited

U.S. PATENT DOCUMENTS

| | | | |
|---|---|---|---|
| 3,668,624 | 6/1972 | Spaulding | 340/905 |
| 3,739,179 | 6/1973 | Krekow . | |
| 4,348,652 | 9/1982 | Barnes et al. . | |
| 4,925,335 | 5/1990 | Eigenmann | 400/12 |
| 5,081,585 | 1/1992 | Kurami et al. | 364/424.02 |
| 5,204,814 | 4/1993 | Noonan et al. | 364/424.02 |
| 5,229,602 | 7/1993 | Juliger | 250/222.2 |
| 5,319,368 | 6/1994 | Poholek | 340/988 |
| 5,786,772 | 7/1998 | Schofield et al. | 340/903 |

FOREIGN PATENT DOCUMENTS

| | | |
|---|---|---|
| 451 117 | 10/1991 | European Pat. Off. . |
| 2213549 | 8/1974 | France . |
| 2 580 097 | 10/1986 | France . |
| 87/02164 | 4/1987 | WIPO . |
| 90/13103 | 11/1990 | WIPO . |

*Primary Examiner*—Edward Lefkowitz
*Assistant Examiner*—Davetta Woods
*Attorney, Agent, or Firm*—Pillsbury Madison & Sutro LLP

[57] ABSTRACT

A device for improving vehicle driving safety and comfort is disclosed. The main road sign information encountered during a journey is transmitted to the vehicle, the position of the vehicle on the driving surface is continuously monitored, and the road surface is checked for the presence of foreign matter such as mud, snow, ice, etc. A set of transmitting-receiving sensors (C1, C2) suitably arranged on the vehicle and facing the driving surface continuously observes changes in the reflective properties of the observed areas within the sensitivity range thereof. Markings defining lanes and shoulders lined with grassy, gravelly or sandy areas are sensed by the sensors (C1, C2) as soon as the vehicle approaches or drives over them. The signals from the sensors (C1, C2) are processed by an electronic unit (1) controlling an on-board signalling system (2) linked to an alarm system (3) for warning the driver of road hazards and possible unsafe driving (straying off-course, speeding, etc.). By reacting instantly, the driver thus informed can avoid a potential accident.

30 Claims, 6 Drawing Sheets

ROAD MONITORING DEVICE

This is a continuation of PCT/BE96/00116 filed Nov. 4, 1996.

BACKGROUND OF THE INVENTION

1. Field of the Invention

The present invention concerns monitoring devices aimed at improving driver safety and comfort without requiring numerous changes to the existing roadway network.

2. Description of the Related Art

There are often dangerous traffic jams on our roads and serious accidents may be caused by a mere lack of attention involving milliseconds.

One of the invention's aims is to provide monitoring devices that will help to draw the driver's attention to dangerous situations. Some solutions recently proposed in order to improve road safety generally demand great changes to the existing roadway network infrastructure, needing external energy sources such as Hertzien transmitters, cameras, etc . . .

Accidents due to the driver's drowsiness or inattention are still frequent because no effective monitoring system exists. Processes being developed and using cameras to observe the driver's posture are not able to detect a momentary distraction and prompt reaction is not always guaranteed.

A previous patent with reference U.S. Pat. No. 4,348,652 proposes an onboard device to check a motor vehicle straying off course, when moving between the center line and lateral markings of a lane.

The device such as described takes into account only centrally and laterally marked lines of a specific width (between 4 and 5 inches) in a tangential approach of the vehicle which would require a significant change in the lines painted on the roadway network.

This major change to the roadway network would actually only partially monitor the path of the vehicle, thus limiting any development of the system.

SUMMARY OF THE INVENTION

The present invention is characterized by a large range of traffic parameters checked by means of an onboard system requiring no external source of energy.

It uses a continuous relationship existing between the aforesaid vehicle and a driving surface upon which it is moving to transmit on board information related to the vehicle's position in the lane, the presence of foreign objects in the lane as well as the principal traffic sign posts met with along the vehicle's path. The driver is warned by an on board signalling system and possibly by an alarm when the vehicle is moving in a way that does not correspond to the registered parameters and he is invited to react in order to avoid a potential accident.

The invention is able to use at least one of the following elements: existing markings on roads and motorways as well as grassy, stony and sandy roadsides, the existence of center strips, guardrails and the hardshoulders in order to monitor the vehicle's path and/or detect the approach of a hazardous situation or speeding.

Foreign objects such as patches of snow, (black) ice or mud creating a discontinuity in the road surface will also be perceived by a vehicle in motion equipped with the invention's monitoring device.

The invention's road monitoring device comprises a set of sensors capable of detecting changes on the driving surface.

This set of sensors is preferably composed of transmitters capable of emitting waves that are reflected off the driving surface and of receivers sensitive to the waves reflected from off this same driving surface. The sensors are judiciously located facing the road surface and react to the variations in the reflective property of the surfaces scanned within the range of their sensitivity. Their operation is disturbed neither by ambient light nor by rain.

To protect the sensors from flying particules, they should be placed at the front of the vehicle at a sufficient height to benefit from shelter given by the bodywork.

However it is also possible to place the sensors in another area adequately protected. It is also possible to fix the sensors on the vehicle's outside rearview mirrors or in the bumpers facing the driving surface. To take account of metallic or concrete guard rails, it would be advisable to provide for sensors whose sights are aimed at the guard rails.

A telescopic sight possibly with reflectors makes it possible to define or to increase the sensors' field of vision.

These reflectors together attached or not to the sensors direct emitted waves and guide them after a first reflection from off the driving surface both ahead of and across the line of advance towards the receivers.

Different sorts of sensors may be utilized on the same vehicle. However the correspondence between the type of sensors and the kind of lines this sensor is expected to observe must be respected.

The operating threshold of these sensors may be guided by one or several of them by comparing the average reflective property of the driving surface with the reflections from off the discontinuities appearing on this surface (differential measurement). In this way climatic conditions in the observed measurements and the nature of the road surface (asphalt concrete) are taken into account.

Increasing the number of sensors equipped possibly with reflectors assures a perception of the broken lines with a wider angle of approach of the vehicle because a greater part of the vehicle's width is checked. The vehicle's crossing of one of these lines will then be perceived at least by one of them. Mounting the sensors outside the vehicle's body, for example on the external rearview mirrors, assures a faster detection of the longitudinal lines dividing the driving lanes and of the sides of the road.

The space contained in the telescopic sight can be made hermetic or a transparent body can be placed in it to avoid a possible disturbance of the wave propagation as a result of a thick fog or untimely fumes.

When the vehicle approaches the marked lines or goes across them or when the vehicle approaches the guard rails or when the road surface presents discontinuities the corresponding sensors react and send their signals to an electronic command and control unit. This unit commands in its turn a unit identifying registered parameters, and activates, if necessary, an alarm system and automatic functions.

The order and origin in which impulses from the sensors reach command and control unit, the number of impulses and the lapse of time between two series of successive impulses are examples of the many parameters that will determine with accuracy the content of the message to be transmitted to the signalling system.

The driver perceives the messages via light and sound signals or via displayed or vocal messages. An alarm system is able to identify registered defects issuing at the same time alarm signals which may be of numerous kinds (light, sound, vocal, displayed and sensory).

It is better for the alarm circuit to be switched off by hand in order to oblige the driver to react.

It may be automated in certain cases, the duration of the alarm signals being limited to some seconds.

The alarm sound level may be regulated by the driver. However for serious errors the alarm will sound at a high and lasting level.

When the driver wants to move from one lane to another, he may avoid triggering the warning system if he switches on the turn signal beforehand.

To control speeding in a built-up area, the driver may be notified that he is exceeding the maximum authorized speed thanks to lines at right angles and to various markings already present. To do this, a relationship has to be established between the vehicle speed and the possibility of triggering the alarm system. The driver may choose himself the maximum speed level to be checked, for example 50 kph+10% (approx. 30 mph).

However it is possible to measure automatically the value of this maximum speed at the precise spot where it begins by means of additional lines arranged at this place. All the following signs at right angles may be used to check the vehicle speed. By linking the alarm system to the vehicle speed, unsuitable reactions of the alarm may also be avoided even in a built-up area if not exceeding the speed limit (fixed by hand or automatically).

The triggering of the alarm system when passing any line or sign will inform the driver that he is exceeding the authorized speed or the predetermined speed limit. When the signals are prolonged from sensors at rest on a white line or when the driver is on a snow covered road, it is best if the alarm system is switched off automatically.

The correct operation of each of the sensors is itself continuously checked and a possible defect of one of them will be signalled on board. To do this, the wave level perceived by each of the sensors' receivers is measured for example.

The prolonged absence of variations in reflected waves from one or another of these sensors means that it is not working. If the alarm circuit breaker mechanism is jammed for a long time an antijamming system automatically restores the normal working of the alarm. To do so, one measures the time the circuit breaker is off (a push button). If this time exceeds a certain value its action will be automatically cancelled and can only be restored after the circuit breaker has been released.

A great number of specific messages transmissible to the driver may be determined thanks to a combination of a) the number and location of the sensors on the vehicle and b) sets of lines judiciously laid out on the roadway.

It is also best if the electronic circuit also operates means of activating automatic functions of the vehicle in motion.

The addition at dangerous places of segments of lines (dots, a rectangular section or various shapes) regularly spaced on the lane may define an ideal path giving the driver more space and time to react in case his vehicle swerves. By adding a line at right angles at a spot with an important signal the driver's attention is drawn to the presence of these signs by for example, an orange light and a short beep.

Supplementary marks composed of lines of appropriate nature and shape laid out in a precise way on the road either crossing it or along the existing marks increase the accuracy and the amount of information transmissible to the vehicle (more precise path at dangerous spots, one-way road, speed limit, approach of a dangerous crossroads or bend, etc . . . ).

This information is used not only for transmission to the driver and to inform him of a possible driving error but also to carry out certain automatic corrections such as slowing the vehicle down, putting the turn signal on, switching on the headlights before entering a tunnel. . . .

BRIEF DESCRIPTION OF THE DRAWINGS

Other particularities or advantages of the invention will be described with regard to specific aspects of construction, reference being made to the enclosed drawings in which.

DETAILED DESCRIPTION OF THE INVENTION

EXAMPLE 1

Figure 1:
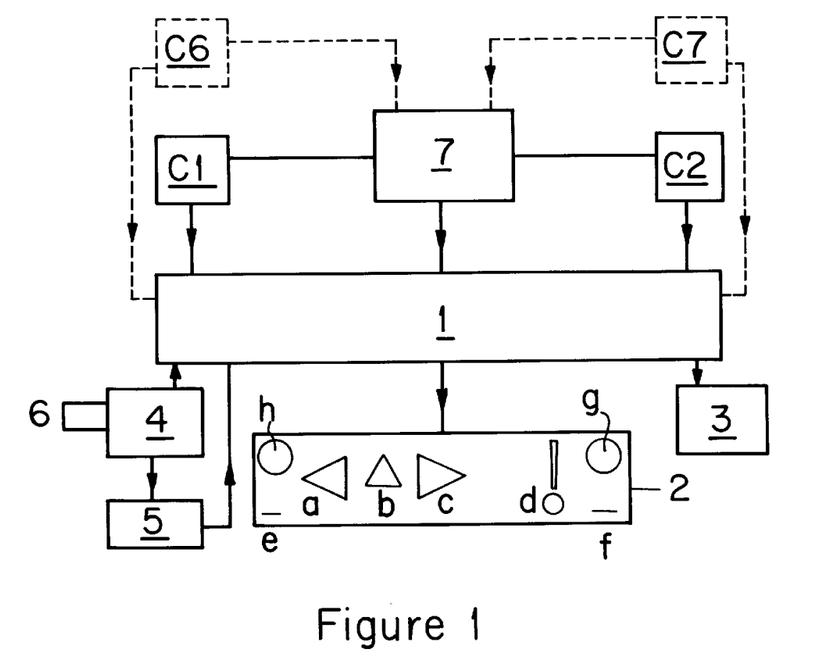
FIG. 1 represents a block diagram of a basic onboard system.

Two sensors C1, C2 are located one in the left front corner and the other in the right front corner (FIG. 1). The sights are slightly inclined towards the vehicle's external sides (FIG. 3—drawing 1).

Figure 3:
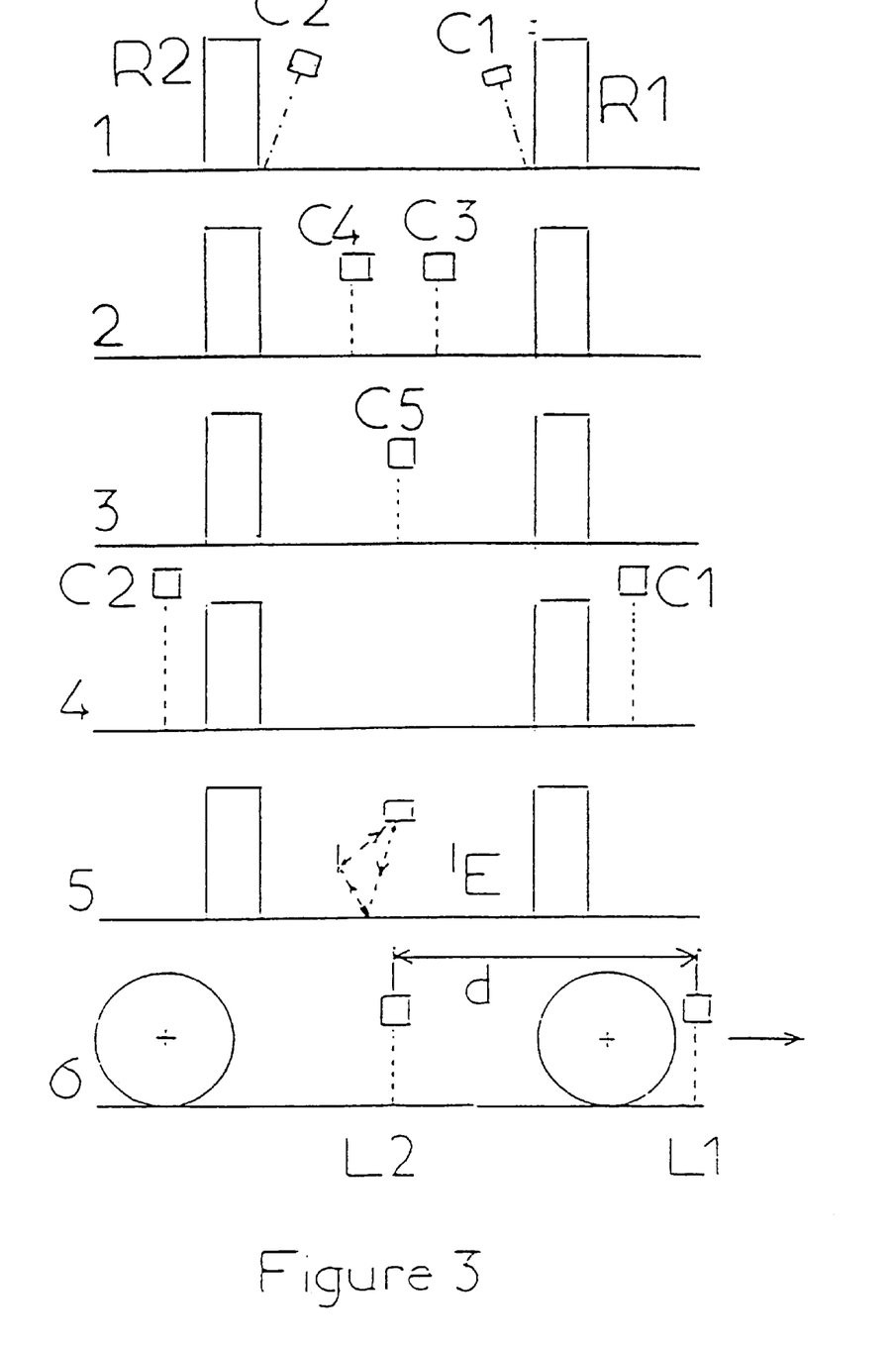
FIG. 3 illustrates sensors in different positions.

In FIG. 3 the drawings 1 to 5 represent the profile of the front wheels R1, R2 placed on the ground and a front view of the position of sensors C1, C2, C3, C4, C5 (sheltered by the bodywork or the front bumper). The front wheel R1 illustrated in the drawings 1 to 5 of FIG. 3 is located at the vehicle's left front. The sensitivity threshold of these sensors C1, C2 is adjusted on the basis of a light coloured line (white or yellow). This adjustment, taking into account the wavelengths chosen in the infrared range, also allows a good sensitivity on sand or on grass or on snowy or icy surfaces.

When the vehicle approaches or goes over the lines defining its lane, the sensors C1, C2 detect them. First sensor C1 will detect a swerve to the left or sensor 2 a swerve to the right. The signals of these sensors C1, C2 will be conveyed to the electronic circuit 1 which operates the signalling unit 2 on board as well as the alarm system 3.

The signalling system 2 such as illustrated in FIG. 1, comprises two red arrows a, c, one arrow b, one exclamation mark d, red lights e, f able to signal an inaccurate working of the sensors C1, C2 and a push button g to regulate the alarm sound level of the alarm system 3.

The red arrows a, c indicate the direction in which the vehicle is drifting. The alarm system sound signals 3 also indicate the direction of swerve, the sound being lower for the left and higher for the right. The green arrow b indicates that the vehicle is keeping to the center of its lane and also that the monitoring system is working.

When alarm signals from alarm system 3 appear, the driver instantly realizes that he has left the lane. If he really intended to move into another lane, he can avoid triggering the alarm system if he puts on his turn signal.

If he intends to return to his initial path, he recentres his vehicle and stops the alarm by activating the push button 6 fixed on lever 4 of the turn signal.

The appearance of a line at right angles or of a layer of snow or of another discontinuity simultaneously activates C1 and C2. This simultaneous switching off perceived by the electronic circuit lights up a hazard sign in the shape of an orange coloured exclamation mark and sounds a short beep impeding the operation of the vehicle path monitoring system since this system is not concerned.

The driver is thus warned that there are marks on the ground or that a discontinuity exists on the driving surface.

If the push button 6 happens to be jammed, this is monitored by the antijamming device that restores the alarm system activity 3 even if the system's circuit has been broken for a prolonged period. The push button function 6 can only be restored if it has been released.

The correct working of C1, C2 is itself checked by a monitoring unit 7 which checks the permanence of the waves' variations reflected for each sensor C1, C2, indicating by means of red lights e, f a jamming or their possible breakdown (no more variations).

The average of the waves reflected by the sensors corresponds to the average reflective power of the road surface.

Every discontinuity appearing on this surface leads to a significant variation of the reflective coefficient in relationship to this average value and will be registered by the electronic circuit 1 as a useful signal. This differential measurement is not absolutely necessary for the operation of the road monitoring system.

The sound alarm volume of the alarm system 3 is adjustable by button g with a minimum value beneath which it is not allowed to descend to remain safe. The start of the road monitoring device is assured by the push button h or simply by the vehicle moving off thus ensuring the continuous working of this safety device.

EXAMPLE 2

Figure 2:
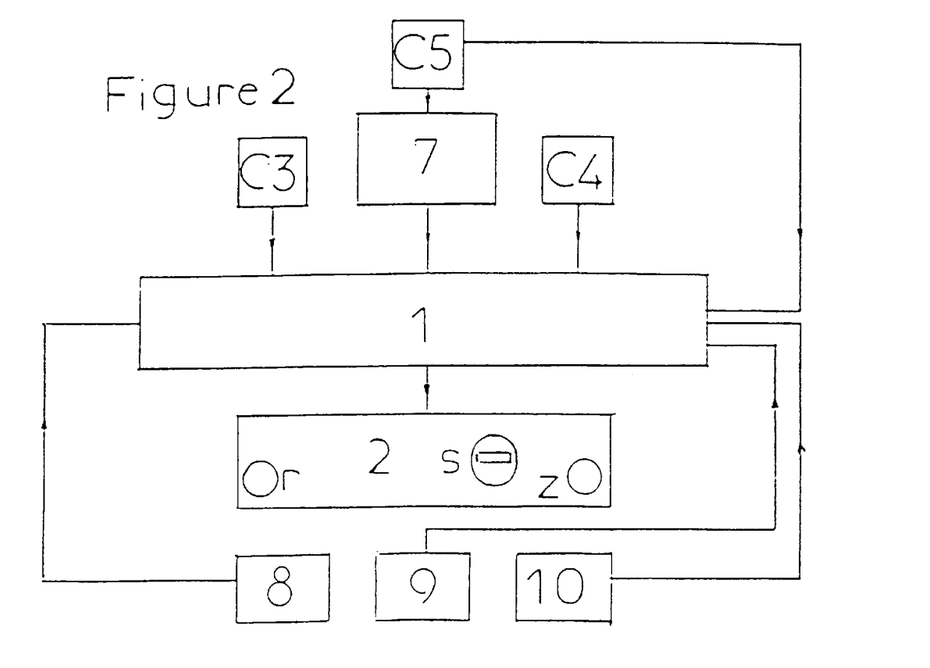
FIG. 2 represents a block diagram of a more effective on board system.

The road monitoring system illustrated in FIG. 2 uses the same components as those in example 1 to which some complementary elements are added in order to obtain a wider application of the road monitoring device.

A speed measurement unit 9 measures the vehicle speed, the value of which is recorded in the electronic circuit. On the signalling system 2 the driver has available to him a rotating or push button switch z allowing him to determine the speed at which the alarm system 3 may start. This speed could vary between 0 kph and 75 kph, for example.

To be able to detect broken lines when the vehicle's approach is with a wider angle of penetration q (FIG. 4), sensors C3 and C4 should be added for example (FIG. 2 and FIG. 3 (2)), which with C1 and C2 cover nearly the whole vehicle width. The use of reflectors E makes it possible to achieve the same result with fewer sensors (FIG. 3 (5)) because the reflectors increase the field scanned by the sensors.

Sensor C5 (FIG. 2 and FIG. 3 (3)) is optional. It is used to measure the average reflective power of the surface, this value being taken as a reference to determine the activation threshold of the sensors C1, C2, C3, C4.

It may also replace the sensors C3, C4 while at the same time controlling the sensors C1 and C2.

Some car manufacturers have requested the possibility of being able to distinguish solid lines from broken lines giving the driver the choice not to use the broken lines in monitoring the vehicle's path. To do this, the electronic unit measures the activation period of the sensors C1, C2, C3, C4. If a (FIG. 4) indicates the maximum length of a broken line and V the vehicle speed, a maximum continuous activity time of the sensors C1, C2, C3, C4 may be obtained close to a/V seconds.

Figure 4:
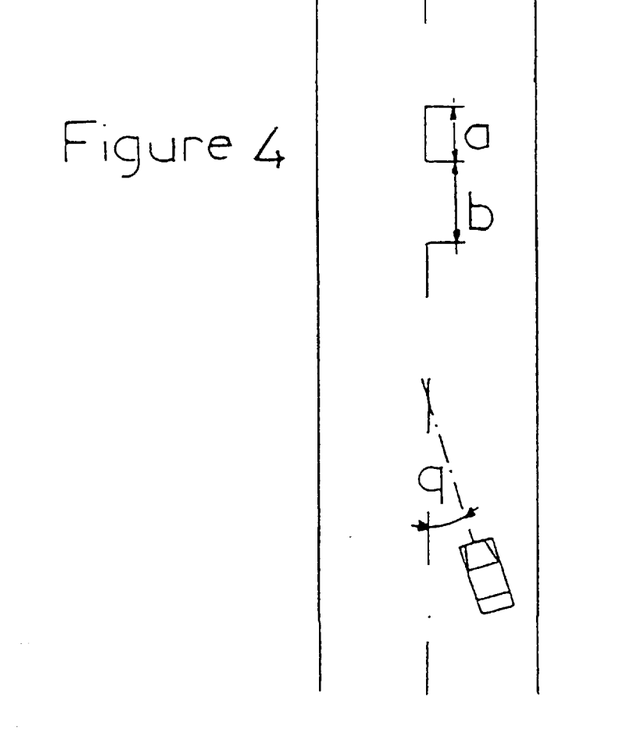
FIG. 4 illustrates a vehicle's position reaching broken lines.

When the vehicle crosses a solid line, the activation period of the sensors C1, C2, C3, C4 will be well above this value. The electronic unit 1 will only permit the activation of the alarm system 3 for periods of activation higher than a/V corresponding only to the vehicle passing over solid lines.

The distinction may also be made between solid lines and broken lines without using the vehicle speed. A first row of sensors L1 is located at front of the vehicle. A second row of sensors L2 is placed in L2 (FIG. 3 (6)). The distance d separating L1 from L2 is determined by the relationship $$d = \frac{a+b}{2},$$

a being a broken line average length and b the average distance separating two successive broken lines. The alarm system 3 monitoring the vehicle path will only be able to react if there is a simultaneous activation of at least one sensor in the row of sensors L1 and of at least one sensor in the row of sensors L2. This simultaneous activation will only appear when passing over a solid line.

In both cases the driver will be able to choose the monitoring method he wants to obtain by pushing the button r (FIG. 2).

EXAMPLE 3

To make the distinction between the existing lines and the new lines specific to the invention one may utilize lines with a higher reflective power (for example metallic surfaces, etc . . . ) or absorbent (for example a rubberised surface).

Using such a type of line or two coupled lines makes it possible to increase the alarm system possibilities as described in the following examples.

In this example as in the following examples, the vehicle will be equipped with two sensors C6, C7 located at the front of the vehicle in the left corner and in the right corner respectively (FIG. 1 drawing in dotted lines).

The activation or desactivation threshold of these sensors C6, C7 is regulated by the new lines that are more reflective and absorbent. They will thus not react to the other already existing lines.

Figure 5:
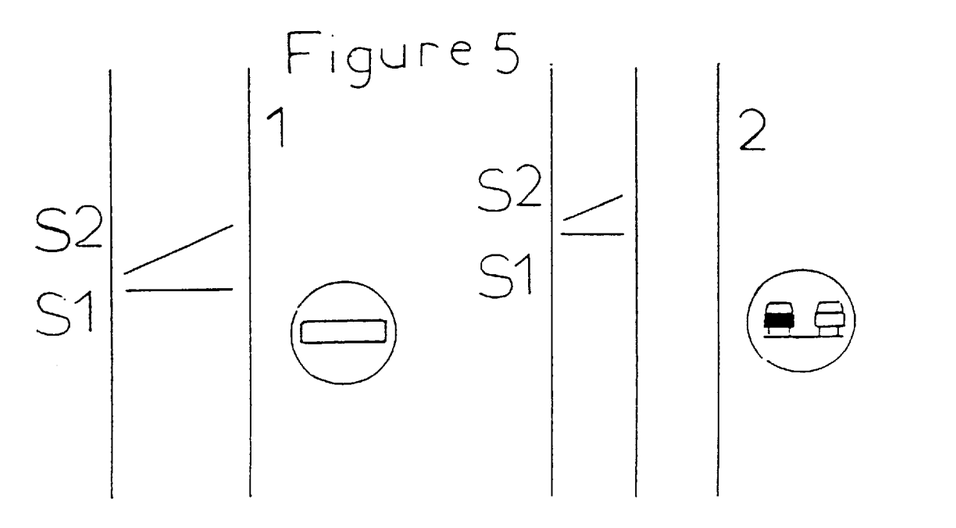
FIG. 5 characterizes a double line at right angles marking at the entry to a motorway indicating no entry for vehicular traffic and on a road where it is forbidden to overtake.

FIG. 5 shows the lay out of the more reflective lines S1, S2 in a lane to detect a no entry for vehicular traffic sign (1) (a motorway ramp for example) and a no overtaking sign (2) on a road with two way traffic. Going the wrong way the vehicle will first meet the line SI that simultaneously activates C6, C7. Then the sensors are briefly deactivated, then when passing over the oblique line S2 there is activation first of C6 alone followed by C7. This cycle of impulses is used by the electronic circuit 1 to detect a no entry for vehicular traffic sign and to activate the corresponding alarm of the alarm system 3. Going in the opposite direction, crossing the line S2 will activate first C6 then C7 and then when passing over the line Si there will be simultaneous activation of C6 ad C7. This cycle of impulses does not trigger the alarm system 3.

FIG. 5 (2) shows the same lay out of segments S1 and S2 on a two way road with a no overtaking sign for the left hand lane. The activation cycle of C6, C7 is the same as for the no entry for vehicular traffic if the vehicle takes the prohibited lane.

EXAMPLE 4

Figure 6:
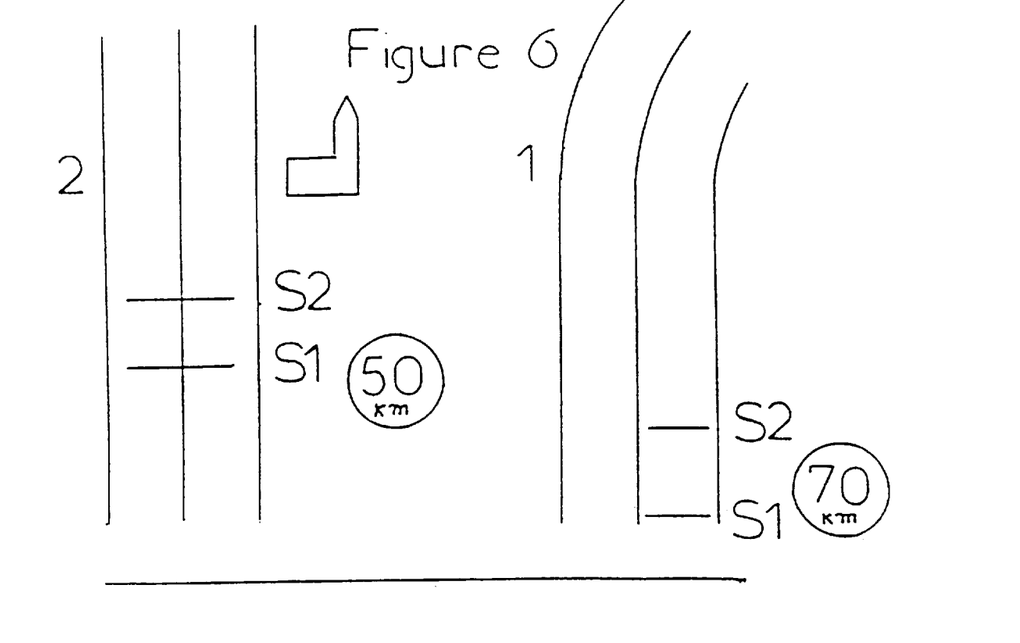
FIG. 6 characterizes a marking with two parallel lines to monitor a vehicle's speed.

FIG. 6 shows the relevant position of the two lines S1 and S2 to check the vehicle speed when approaching a hazardous bend (1) and when approaching a built-up area (2).

Figure 7:
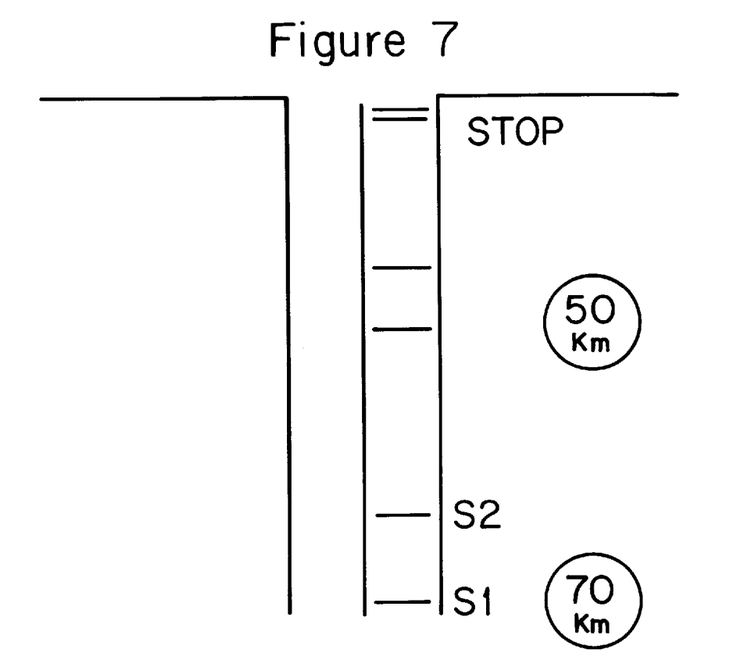
FIG. 7 characterizes a marking utilizing three pairs of parallel lines to monitor a vehicle's speed when approaching a crossroads marked with stop signs.

FIG. 7 characterizes three double lines with the vehicle approaching a crossroads with stop sign.

In all cases, the lines S1 and S2 are placed at right angles to the road axis. The distance between the lines S1 and S2 is determined by the maximum authorized speed at this place. For example, it is calculated at this speed over the distance covered in 4 seconds. For a 50 kph speed limit this distance will thus be close to 56 meter.

When passing over the line S1 (placed near the speed limit sign) vehicle records the simultaneous impulses from sensors C6 and C7 at time T1. Passing the line is indicated to the driver by the orange light d (FIG. 1) and the beep.

This light d will remain lighted for 4 seconds. If the vehicle passes the line S2 at time 2 so as T2-T1 will be less than 4 seconds it means that the vehicle has exceeded the authorized speed limit and the orange light d will turn red and the corresponding alarm will sound. On the other hand, if the vehicle passes over the line S2 after 4 seconds and after the red light has turned off, there will be no reaction of alarm system 3 since the driver is not at fault.

Moreover, by measuring the surface covered between T1 and T2 by the vehicle thanks to a unit measuring the distance covered 10 (FIG. 2), the electronic circuit 1 registers the imposed speed limit value. This value being known, the vehicle speed is easily slowed down automatically thanks to an automation unit 8 (FIG. 2) using for example the brake on the engine acting by reducing the feed supply.

EXAMPLE 5

FIG. 7 shows how a vehicle speed can be reduced to practically zero by using three pairs of double segments the distance between which gets closer and closer:

at 70 kph it will be 78 meters at 50 kph it will be 56 meters at 1 kph it will be 1,1 meter.

EXAMPLE 6

Figure 8:
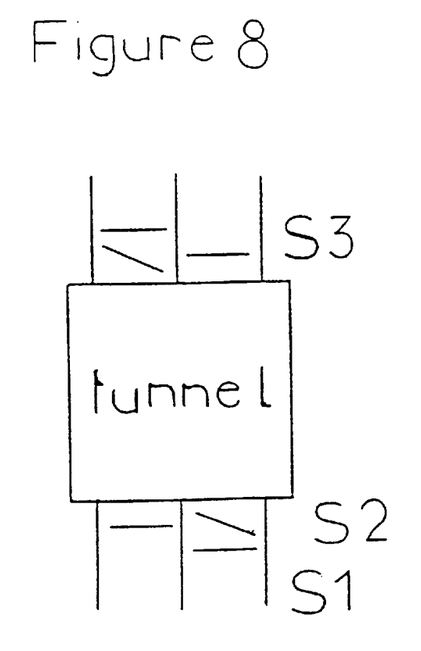
FIG. 8 characterizes a marking with two lines to automatically switch on the headlights when entering a tunnel.

FIG. 8 shows the lay out of the lines S1 and S2 and S3 at the tunnel entry and exit in order to automate thanks (to an automatic unit 8) the switching on of the headlights and to warn the driver by the orange light d FIG. 1 and a beep that the headlights are switched on when exiting.

The line S1 at right angles to the road axis followed by the line S2 placed obliquely (in the opposite direction to the sign for no entry for vehicular traffic) determines the activation cycle of the sensors C6 and C7 following simultaneous activation of C6 and C7, deactivated then activation of C7 alone followed by C6. This cycle may be utilized by the electronic circuit 1 to operate (thanks to an automation unit 8 FIG. 2) the automatic lighting of the vehicle headlights.

The line S3 laid out at right angles to the road axis at the tunnel exit will simultaneously activate the sensors C6, C7 lighting up the orange signal and sounding a beep in order to draw the driver's attention to the fact that the headlights are on. The activation of sensors C6 and C7 has priority over the signals from the sensors C1, C2, C3, C4.

In this way, all the markings on the ground can be dominated by preceding them with a line S1 when there is no wish that they be perceived as a useful message.

EXAMPLE 7

Figure 9:
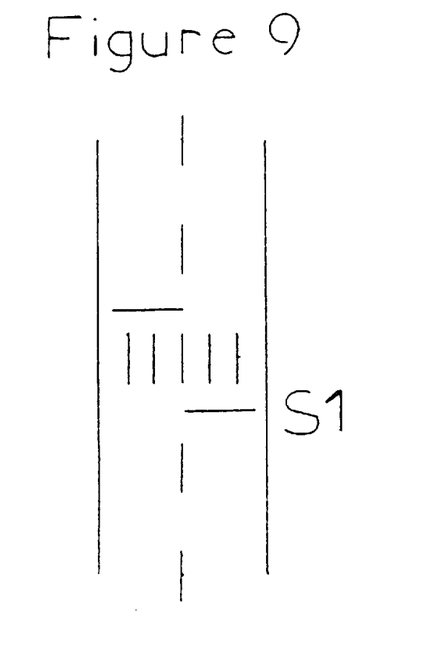
FIG. 9 characterizes a supplementary marking of one line which is associated with a zebra crossing to avoid triggering the alarm system when crossing it.

FIG. 9 shows how existing lines may be combined with new highly reflective lines to avoid useless lines being scanned.

It concerns a zebra crossing. The right lane is represented on the right side in FIG. 9; a solid line SI activates the sensors C6, C7 when the vehicle passes in either direction cancelling for 4 seconds the other sensors C1, C2, C3, C4 being affected by the zebra crossing lines.

EXAMPLE 8

Figure 10:
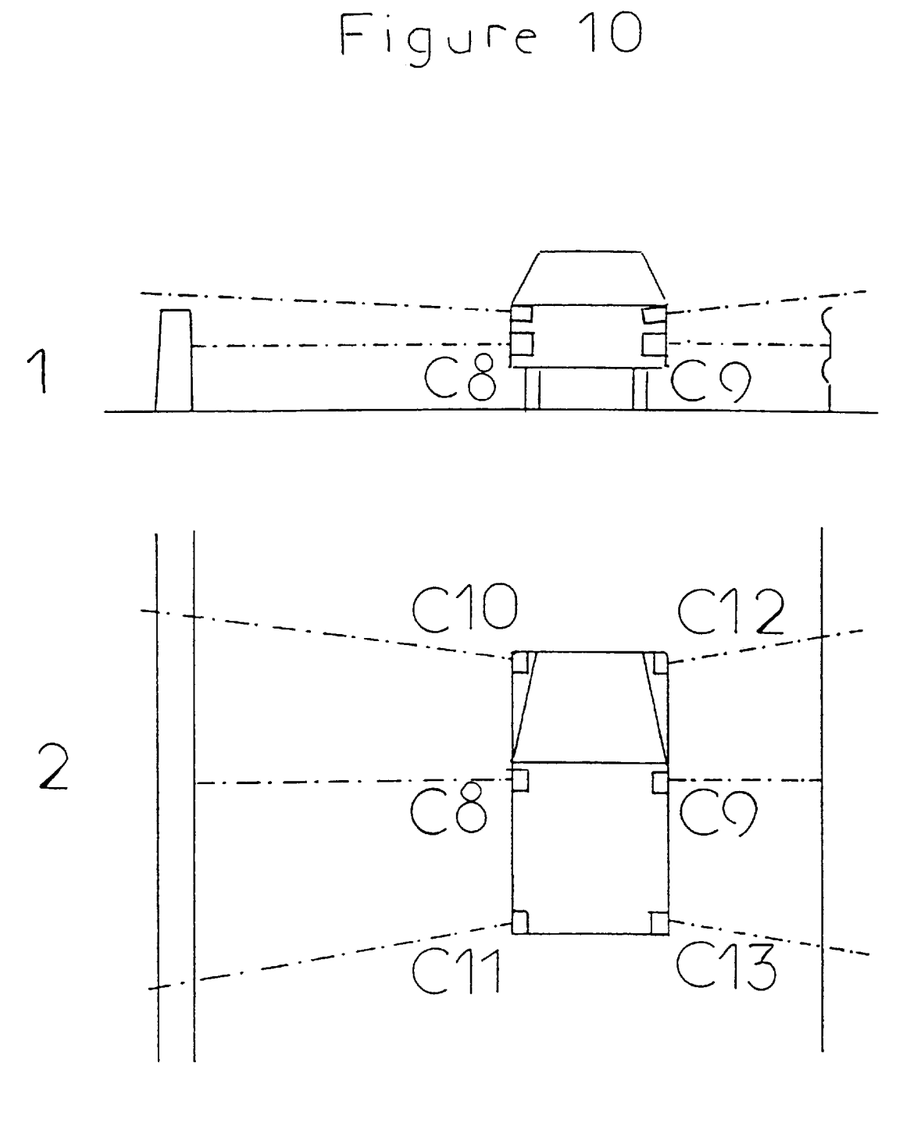
FIG. 10 characterizes the sensors' position in relation to the guard rails.

FIG. 10 shows how utilizing sensors C8, C9 aimed at the guard rails on each side, a vehicle may be detected approaching too close to these guard rails. In this case, the activation threshold of the sensors C8, C9 will be adjusted for a minimum approach distance of about one or two meters (adjustable value) from these barriers. To distinguish between the presence of these barriers and a vehicle passing the action of these sensors C8, C9 may be subordinated to the action of the other sensors C10, C11, C12, C13 (FIG. 10) the whose sights are located on both sides and at a higher level than those of sensors C8, C9 in such a way as to encounter the lateral surface of an approaching vehicle without scanning the guard rails.

The action of the turn signal may be utilized to release the sensors C8, C9 in order to notify the driver of the possible presence of a vehicle in the blind spot of his mirror when he begins to overtake.

Flashing signals may be located, for example, on the vehicle's external rearview mirrors to identify the possible position of vehicles (to the left-right) in the blind spot.

The industrial application of the road monitoring system may be started at the present time without changing any aspect of the roadway network by equipping new vehicles and vehicles already in use (cars, lorries, coaches, etc . . . ) with this device.

The vehicles thus equipped will be able to check the path they are following, some speed limits and also the presence of sheets of snow or ice in the lane.

New vehicles may be manufactured with a housing for the sensors and with connections, signalling devices on the dash board, near the steering wheel or even on the steering wheel itself or on the rearview mirrors, the automatic functions taking into account measurement of the vehicle speed and measurement of the distance covered between two bench marks. As for vehicles in use a protective housing must be provided as well as the way to attach them to different parts of the vehicles as well as the alarm and monitoring system that will have to be placed near the driver. The addition to the driving surface of some new lines of the same nature as those that are used now or of a distinct nature (more absorbent or more reflective) makes it possible to increase significantly the field of the road monitoring system.

I claim:

1. A road monitoring device on board a vehicle, comprising:

at least one sensor facing a driving surface, said at least one sensor capable of scanning said driving surface and detecting changes on said driving surface scanned while the vehicle is in motion;

a telescopic sight protection unit encompassing said at least one sensor in a tight compartment and including a transparent window separating said at least one sensor from the external surroundings, said transparent window positioned such that said at least one sensor will work correctly in the event that at least one of water being splashed and dust being deposited on sad transparent window, wherein said telescopic sight protection unit protects said at least one sensor from external ambient conditions, said at least one sensor comprising at least one transmitter capable of transmitting infra-red frequency waves not affected by ambient light towards said driving surface and at least one infra-red signal receiver capturing waves emanating from the corresponding at last one transmitter and reflecting off of said driving surface;

a signaling system capable of indicating driving surface changes; and an electronic unit capable of operating said signaling system using information obtained from said at least one sensor, said electronic unit being capable of making an initial adjustment of a sensor sensitivity threshold, taking account of the wave lengths chosen in the infra-red frequency range thus allowing for sensitivity to foreign objects, and said electronic unit being capable of making telescopic sight adjustments to define or increase the useful field of said at least one sensor, wherein foreign objects including sand, grass, snow, ice layers, hard shoulders, center strips and guard rails may be detected and said signaling system may warn a vehicle driver of driving surface conditions.

2. A road monitoring device as claimed in claim 1 wherein said at least one sensor possesses a sensitivity threshold individually adjustable to the nature of the surface scanned and to the intervening distance.

3. A road monitoring device as claimed in claim 1 wherein the operation of said at least one sensor is not disturbed by external ambient conditions such as daylight, rain or fog.

4. A road monitoring device as claimed in claim 1 wherein said at least one capable sensor is capable of following the changes in the surface scanned both along and across the line of the vehicle's path.

5. A road monitoring device as claimed in claim 1 wherein said device comprises at least one reflector capable of orienting emitted and reflected waves of said at least one sensor.

6. A road monitoring device as claimed in claim 1 wherein the signaling system issues messages by means of luminous signals, by sound messages, by written messages, by vocal messages or by sensory messages the emission period of which is automatically limited.

7. A road monitoring device as claimed in claim 1 further comprising an alarm system.

8. A road monitoring device as claimed in claim 7 wherein the alarm system issues luminous signals, written signals, vocal signals or sensory signals the emission period of which is automatically limited.

9. A road monitoring device as claimed in claim 7 wherein said device comprises an automatic temporary locking device for the alarm system as soon as the road vehicle turn signal switched on.

10. A road monitoring system as claimed in claim 7, wherein said device comprises a cut off means for the temporary automatic locking device of the alarm system.

11. A road monitoring system as claimed in claim 10, wherein the cut off means is fitted with an antijamming system stopping the action of the cut off whenever the latter is jammed for a long time.

12. A road monitoring device as claimed in claim 1 wherein said device comprises a checking unit capable of monitoring the correct functioning of said at least one sensor.

13. A road monitoring device as claimed in claim 1 wherein said device comprises an alarm system cut off device when there is a prolonged action of said at least one sensor.

14. A road monitoring device as claimed in claim 1 wherein said device comprises at least one sensor capable of detecting the presence of guard rails.

15. A road monitoring device as in claim 14 wherein said device comprises one sensor capable of detecting the presence of vehicles approaching laterally in order to make the distinction between the approach of a vehicle and that of guard rails.

16. A road monitoring device as claimed in claim 1 wherein the device comprises, in addition to said at least one, sensor, a plurality of sensors, each of said at least one sensor and said plurality of sensors being located and being adjustable for operational sensitivity which make it possible to obtain signals from surfaces scanned by each of said at least one sensor and said plurality of sensors, wherein said obtained signals, when combined with each other, provide desirable relevant messages.

17. A road monitoring device as claimed in claim 1 wherein said device comprises means to distinguish at will the broken lines from the continuous lines of the road's longitudinal marking.

18. A road monitoring device as claimed in claim 1 wherein said device comprises means to activate automatic functions when a road vehicle is being driven.

19. A road monitoring device as claimed in claim 1 wherein the road vehicle's external rearview mirrors are used to locate on them one or more sensors.

20. A road monitoring device as claimed in claim 1 wherein the road vehicle's external rearview mirrors are used to locate on them a means of signaling.

21. A road monitoring device as claimed in claim 1 wherein said device comprises means to activate automatically the vehicle's turn signals by using marking use of the road markings.

22. Utilization of a road monitoring device as in claim 18 to trigger one or more automatic functions of the road vehicle by means of one or several sets of double lines arranged across the driving surface.

23. Utilization of a road monitoring device as in claim 22 wherein the automatic function concerns the automatic switching on of the road vehicle's headlights by means of two non parallel lines across the driving surface.

24. Utilization of a road monitoring device as in claim 22 wherein the automatic function concerns slowing down the road vehicle automatically by means of one or several sets of two parallel lines across the driving surface, said lines being ever nearer to each other.

25. Utilization of a road monitoring device as claimed in claim 22 to check speed, vehicle position on the driving surface, no overtaking, no entry for vehicular traffic, approach of a crossroads, stop sign or hazard turn.

26. Utilization of a road monitoring device as claimed in claim 15 to check the presence of a vehicle in the blind area of the driver's vision.

27. A road monitoring device as claimed in claim 1 or 3 wherein the telescopic sight comprises a glass enclosed hermetic protection space to avoid possible disturbance of the external wave propagation.

28. A road monitoring device as in claim 1 or 3 wherein the telescopic sight comprises a hermetic protection transparent body which avoids possible disturbance of the external wave propagation.

29. A road monitoring device as in claim 1 or 3 wherein the telescopic sight comprises a hermetic protection closed by a glass placed in an inclined plane in regard of the sights optical axis.

30. A road monitoring device on board a vehicle as in claim 1, wherein each sensor is capable of switching on colored lines by means of a diffuse and retro-reflective sensing method;

said telescopic sight has a length and an opening diameter adjustable such that the sensor sensitivity may be adjusted to the distance existing between the said at least one sensor and the road, said telescopic sight length and opening diameter being further adjustable to change the detection area to a colored line width; and wherein an operating direction of the telescopic sight being adjustable:

relative to its length and elevation and to said opening diameter to avoid an unwanted switching on of said at least one sensor on a wet road;

to avoid said at least one sensor switching on in response to metallic objects on the driving surface including rails, metallic junctions for bridges, and metallic covers for sewers; and to detect grass, sand and terrepleins using the retro-reflective waves as well as additional diffuse reflective waves reflected from surfaces characteristics including color and elevation back into the telescoping sight.

* * * * *